United States Patent
Philip et al.

(10) Patent No.: US 10,720,830 B2
(45) Date of Patent: Jul. 21, 2020

(54) FAST TRANSIENT LOAD RESPONSE DEVICE FOR SWITCHED-MODE POWER SUPPLY

(71) Applicant: NXP B.V., Eindhoven (NL)

(72) Inventors: Melaine Philip, Blainville/Orne (FR); Fabien Boitard, Mousans Sartoux (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/394,050

(22) Filed: Apr. 25, 2019

(65) Prior Publication Data
US 2019/0348912 A1    Nov. 14, 2019

(30) Foreign Application Priority Data

May 14, 2018   (EP) .................................... 18305587

(51) Int. Cl.
  *H02M 3/04*   (2006.01)
  *H03M 1/32*   (2006.01)
  *H02M 1/08*   (2006.01)
  *H02M 1/32*   (2007.01)
  *H04B 5/00*   (2006.01)
  *H02M 1/15*   (2006.01)
  *H02M 1/00*   (2006.01)

(52) U.S. Cl.
  CPC .............. *H02M 3/04* (2013.01); *H02M 1/08* (2013.01); *H02M 1/32* (2013.01); *H04B 5/0075* (2013.01); *H02M 1/15* (2013.01); H02M 2001/0045 (2013.01)

(58) Field of Classification Search
CPC combination set(s) only.
See application file for complete search history.

(56) References Cited

U.S. PATENT DOCUMENTS

| | | | | |
|---|---|---|---|---|
| 5,838,145 A | * | 11/1998 | Poon | H02M 1/4208 323/266 |
| 6,356,063 B1 | * | 3/2002 | Brooks | H02M 3/156 323/284 |
| 6,696,825 B2 | * | 2/2004 | Harris | H02M 3/156 323/282 |

(Continued)

OTHER PUBLICATIONS

Michal, Vratislav, "Dynamic Duty-cycle Limitation of the Boost DC/DC Converter Allowing Maximal Output Power Operations;" 2013 International Conference on Applied Electronics, Sep. 6, 2016, pp. 177-182, University of West Bohemia, Pilsen, Czech Republic.

(Continued)

*Primary Examiner* — Yuwen Pan
*Assistant Examiner* — Erica L Fleming-Hall

(57) ABSTRACT

This specification discloses methods and systems for reducing negative undershoot during transient load response for a PWM (Pulse Width Modulation) boost power converter. In some embodiments, reduction of negative undershoot during transient load response is achieved by overriding the PWM duty cycle to a maximum duty cycle when VDDBOOST drops during load step. This maximum duty cycle ("max") mode is triggered when VDDBOOST is within a hysteresis window. Setpoint for maximum duty cycle is versus DCDC converter output and input voltage. In some embodiments, a lookup table is implemented for determining the setpoint for maximum duty cycle.

15 Claims, 9 Drawing Sheets

(56) References Cited

U.S. PATENT DOCUMENTS

| | | | |
|---|---|---|---|
| 6,696,882 B1* | 2/2004 | Markowski | H02M 3/1584 323/285 |
| 8,232,786 B2* | 7/2012 | Phadke | H02M 1/4225 323/222 |
| RE46,369 E* | 4/2017 | Zhu | |
| 9,755,517 B2* | 9/2017 | Kobayashi | H02M 3/158 |
| 9,877,659 B2* | 1/2018 | Lee | H01Q 1/36 |
| 2012/0223687 A1* | 9/2012 | Liu | G05F 1/56 323/271 |
| 2013/0187463 A1* | 7/2013 | Lin | G05F 1/10 307/43 |
| 2014/0062427 A1* | 3/2014 | Coleman | G05F 1/614 323/233 |
| 2014/0086301 A1* | 3/2014 | Akhavan | H04L 25/03828 375/238 |
| 2014/0266377 A1* | 9/2014 | Atout | H02M 3/157 327/295 |
| 2015/0077082 A1* | 3/2015 | Kilic | H02M 1/32 323/284 |
| 2015/0118956 A1* | 4/2015 | Desai | H04B 5/0037 455/41.1 |
| 2016/0359414 A1 | 12/2016 | Ozanoglu et al. | |
| 2017/0170728 A1* | 6/2017 | Ihs | H02M 3/157 |
| 2017/0179816 A1* | 6/2017 | Michal | H02M 3/04 |
| 2018/0071522 A1* | 3/2018 | Feldman | A61N 1/086 |

OTHER PUBLICATIONS

Wang, Jing; "Digitally Controlled DC-DC Converters with Fast and Smooth Load Transient Response;" Thesis, Electrical and Computer Engineering, University of Toronto, Canada; Issued Aug. 13, 2013.

* cited by examiner

*Theoretical duty cycle in PWM regulation:*

- $\text{Duty cycle} = 1 - \dfrac{VBATPWR}{VDDBOOST}$

*Maximum duty cycle in PWM regulation with power losses:*

- $\text{Duty cycle} = \left(1 - \dfrac{VBATPWR}{VDDBOOST}\right) \times \left(1 + \dfrac{100 - Power\ Efficiency\ (\%)}{100}\right)$

FIG. 7

FAST TRANSIENT LOAD RESPONSE DEVICE FOR SWITCHED-MODE POWER SUPPLY

CROSS-REFERENCE TO RELATED APPLICATIONS

This application claims priority under 35 U.S.C. § 119 to European Patent Application No. 18305587.0, filed on May 14, 2018, the contents of which are incorporated by reference herein.

FIELD

The described embodiments relate generally to methods and systems for operating a switched-mode power supply (SMPS), and more particularly to methods and systems for operating a fast transient load response device for a switched-mode power supply (SMPS).

BACKGROUND

A NFC (Near Field Communication) device is an example of a communications device that communicates via inductive coupling. NFC is a short-range wireless technology that allows communication between NFC enabled objects over a distance of less than 10 cm. NFC is based on Radio Frequency Identification (RFID) standards. It is a technology that is designed to make an easier and more convenient world for us, enhancing the way we make transactions, exchange content and connect devices.

For mobile applications, a NFC device can include a NFC transmitter. The NFC transmitter can be supplied by a DCDC (or DC-to-DC) converter. For example, a DCDC converter is needed for boosting the battery voltage for higher communication distance.

Because an "NFC Device" is very useful, there are strong motivations for enhancing the performance of a DCDC converter.

SUMMARY

The present specification discloses methods and systems for reducing negative undershoot during transient load response for a PWM (Pulse Width Modulation) boost power converter. In some embodiments, reduction of negative undershoot during transient load response is achieved by overriding the PWM duty cycle to a maximum duty cycle when VDDBOOST drops during load step. This maximum duty cycle ("max") mode is triggered when VDDBOOST is within a hysteresis window. Setpoint for maximum duty cycle is versus DCDC converter output and input voltage. In some embodiments, a lookup table is implemented for determining the setpoint for maximum duty cycle.

This disclosure is novel in providing an integrated solution for DCDC converter fast transient load response. In some embodiments, this disclosure provides for a VBAT-PWR-VDDBOOST lookup table. The lookup table allows for keeping DCDC stability over VBAT (battery voltage) range in case of configurable DCDC output voltage. Additionally, this disclosure also provides the following advantages: (a) no need for higher BOM (bill of materials) and PCB (printed circuit board) footprint, (b) no impact on power dissipation, and (c) no need for extra external components.

The present invention provides for a method for reducing negative undershoot during transient load response that is associated with a PWM (Pulse Width Modulation) boost power converter, the method comprising: (a) switching on a NFC (Near Field Communication) field from an off state, wherein a PWM duty cycle of the PWM boost power converter is set to a steady state value, wherein the switching on of the NFC field creates a negative undershoot during transient load response; (b) detecting when a boost voltage of the PWM boost power converter drops below a first threshold value; (c) setting the PWM duty cycle to a maximum value in response to detecting the boost voltage drop below the first threshold value, wherein the maximum value is higher than the steady state value, wherein setting the PWM duty cycle to the maximum value causes the boost voltage to rise; (d) detecting when the boost voltage rises above a second threshold value, wherein the second threshold value is higher than the first threshold value; (e) setting the PWM duty cycle back to the steady state value in response to detecting the boost voltage rise above the second threshold value, wherein setting the PWM duty cycle to the steady state value causes the boost voltage to drop; (f) continuing the above steps of changing the PWM duty cycle between the maximum value and the steady state value until the boost voltage no longer drops below the first threshold value while the PWM duty cycle is set to the steady state value.

In some embodiments, the maximum value is based on an input voltage to the PWM boost power converter and an output voltage from the PWM boost power converter.

In some embodiments, the maximum value is further based on a power efficiency associated with the PWM boost power converter.

In some embodiments, the maximum value is stored in a lookup table.

In some embodiments, the maximum value is determined by a microcontroller.

In some embodiments, the NFC field is generated by a NFC transmitter, wherein the NFC transmitter is supplied by an output from a LDO (Low-Dropout Regulator) voltage regulator, wherein the LDO voltage regulator is supplied by an output from the PWM boost power converter.

In some embodiments, the transient load response occurs during an initial NFC field on event and/or peer to peer communications.

In some embodiments, the transient load response occurs when a time period between current NFC field on event and last NFC field on event is long.

The present invention also provides for a system comprising: (a) a PWM (Pulse Width Modulation) boost power stage, the PWM boost power stage configured to provide for PWM boost power conversion, wherein the PWM boost power stage provides power for generating a NFC (Near Field Communication) field, wherein the PWM boost power stage inputs an input voltage and outputs a boost voltage; (b) a boost clock scheme, the boost clock scheme configured to provide PWM clock signal to the PWM boost power stage; (c) a voltage monitor, the voltage monitor configured to sense the boost voltage from the PWM boost power stage; (d) a microcontroller, the microcontroller configured to provide a clock reference signal to the boost clock scheme and a setpoint for the boost voltage, (e) wherein the boost clock scheme sets a PWM duty cycle of the PWM boost power stage to a steady state value, wherein switching the NFC field from an "off" state to an "on" state creates a negative undershoot associated with a transient load response, (f) wherein the voltage monitor detects when the boost voltage drops below a first threshold value, (g) wherein the boost clock scheme sets the PWM duty cycle to a maximum value in response to the voltage monitor detecting the boost voltage drop below the first threshold value, wherein the maximum value is higher than the steady state value, wherein setting the PWM duty cycle to the maximum value causes the boost voltage to rise, (h) wherein the voltage monitor detects when the boost voltage rises above a second threshold value, wherein the second threshold value is higher than the first threshold value, (i) wherein the boost clock scheme sets the PWM duty cycle back to the steady state value in response to the voltage monitor detecting the boost voltage rise above the second threshold value, wherein setting the PWM duty cycle to the steady state value causes the boost voltage to drop, (j) wherein the boost clock scheme continues the above steps of changing the PWM duty cycle between the maximum value and the steady state value until the boost voltage no longer drops below the first threshold value while the PWM duty cycle is set to the steady state value.

In some embodiments for a system, the maximum value is based on the input voltage and the boost voltage, wherein the ADC provides the input voltage and the voltage monitor provides the boost voltage.

In some embodiments for a system, the maximum value is further based on a power efficiency associated with the PWM boost power stage.

In some embodiments for a system, the system further comprising: (a) an ADC (analog-to-digital converter), the ADC configured to convert the input voltage from an analog voltage level to a digital voltage level; (b) a lookup table configured to determine the maximum value.

In some embodiments for a system, the maximum value is determined by the microcontroller.

In some embodiments for a system, the NFC field is generated by a NFC transmitter, wherein the NFC transmitter is supplied by an output from a LDO (Low-Dropout Regulator) voltage regulator, wherein the LDO voltage regulator is supplied by an output from the PWM boost power stage.

The present invention provides for a computer program product comprising executable instructions encoded in a non-transitory computer readable medium which, when executed by a system, carry out or control the following method for reducing negative undershoot during transient load response that is associated with a PWM (Pulse Width Modulation) boost power converter, the method comprising: (a) switching on a NFC (Near Field Communication) field from an off state, wherein a PWM duty cycle of the PWM boost power converter is set to a steady state value, wherein the switching on of the NFC field creates a negative undershoot during transient load response; (b) detecting when a boost voltage of the PWM boost power converter drops below a first threshold value; (c) setting the PWM duty cycle to a maximum value in response to detecting the boost voltage drop below the first threshold value, wherein the maximum value is higher than the steady state value, wherein setting the PWM duty cycle to the maximum value causes the boost voltage to rise; (d) detecting when the boost voltage rises above a second threshold value, wherein the second threshold value is higher than the first threshold value; (e) setting the PWM duty cycle back to the steady state value in response to detecting the boost voltage rise above the second threshold value, wherein setting the PWM duty cycle to the steady state value causes the boost voltage to drop; (f) continuing the above steps of changing the PWM duty cycle between the maximum value and the steady state value until the boost voltage no longer drops below the first threshold value while the PWM duty cycle is set to the steady state value.

The above summary is not intended to represent every example embodiment within the scope of the current or future Claim sets. Additional example embodiments are discussed within the Figures and Detailed Description below. Other aspects and advantages of embodiments of the present invention will become apparent from the following detailed description taken in conjunction with the accompanying drawings.

BRIEF DESCRIPTION OF THE DRAWINGS

FIG. 7 shows the formulas for the theoretical duty cycle in PWM (Pulse Width Modulation) regulation and the maximum duty cycle in PWM regulation with power loss.

DETAILED DESCRIPTION

Figure 1:
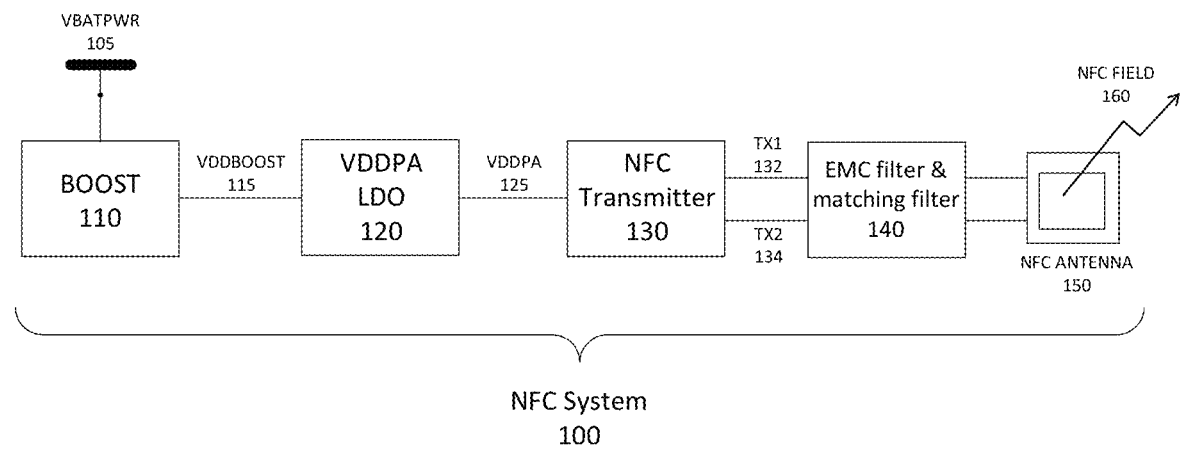
FIG. 1 shows the transmitter path of a NFC (Near Field Communication) system that utilizes a DC-to-DC boost converter and a LDO (low-dropout) voltage regulator in accordance with some embodiments of the invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

As an example, to be integrated within a mobile application, a NFC (Near Field Communication) transmitter is supplied by a DCDC (or DC-to-DC) converter, and then a linear voltage regulator. A DCDC converter is needed for boosting the battery voltage for higher communication distance. A DCDC output voltage ripple is filtered with a LDO (low-dropout) voltage regulator for avoiding interference on communication.

In some embodiments, the trend for secure mobile transaction is to use an inductive DCDC converter with Pulse Width Modulation (PWM). The reason for using an inductive converter is to target for good power efficiency and low output voltage ripple. Using PWM leads to a fixed switching frequency so that there are no spurious noises within the NFC communication bandwidth.

FIG. 1 shows the transmitter path of a NFC (Near Field Communication) system 100 that utilizes a DC-to-DC boost converter 110 and an LDO (low-dropout) voltage regulator 120 in accordance with some embodiments of the invention. In some embodiments, a part of the NFC system 100 can be implemented as an IC (integrated circuit) targeting the mobile market. The IC can integrate a DCDC boost converter (BOOST 110), a LDO voltage regulator (VDDPA LDO 120), and a NFC transmitter 130. An EMC (Electromagnetic Compatibility) filter and matching filter (140) can be placed between the IC and a NFC antenna 150. The NFC transmitter 130 can be used to generate NFC field 160 emanating from NFC antenna 150.

In FIG. 1, NFC system 100 includes a DCDC boost converter 110. The DCDC boost converter 110 can be a DC-to-DC power converter that steps up voltage (while stepping down current) from its input (supply) to its output (load). In FIG. 1, the input (supply) is VBATPWR 105 (e.g., battery power voltage supply). The output (load) is a stepped-up voltage VDDBOOST 115 (e.g., VDD (drain supply) boost voltage).

In FIG. 1, NFC system 100 also includes a LDO voltage regulator (VDDPA LDO 120). The LDO voltage regulator (VDDPA LDO 120) is a DC linear voltage regulator that can regulate the output voltage even when the supply voltage is very close to the output voltage. In FIG. 1, the supply voltage is VDDBOOST 115. The output voltage is VDDPA 125 (e.g., VDD (drain supply) voltage for power amplifier, which is the NFC transmitter 130). The advantages of a LDO (low-dropout) voltage regulator over other DC to DC regulators can include the absence of switching noise (as no switching takes place), smaller device size (as neither large inductors nor transformers are needed), and greater design simplicity (usually consists of a reference, an amplifier, and a pass element). The disadvantage is that, unlike switching regulators, linear DC regulators must dissipate power, and thus heat, across the regulation device in order to regulate the output voltage. However, here the DCDC output voltage ripple from boost converter 110 is filtered with a LDO (low-dropout) voltage regulator 120 for avoiding interference on communication.

In FIG. 1, NFC system 100 further includes a NFC transmitter 130. The NFC transmitter 130 can be a power amplifier, which is an electronic device that can increase the power of a signal (a time-varying voltage or current). In FIG. 1, LDO voltage regulator 120 provides the supply voltage (i.e., VDDPA 125, which is VDD (drain supply) voltage for power amplifier) for NFC transmitter 130, which is a power amplifier. NFC transmitter 130, in turn, provides the outputs TX1 132 and TX2 134 to generate the NFC field 160 emanating from NFC antenna 150.

Figure 2:
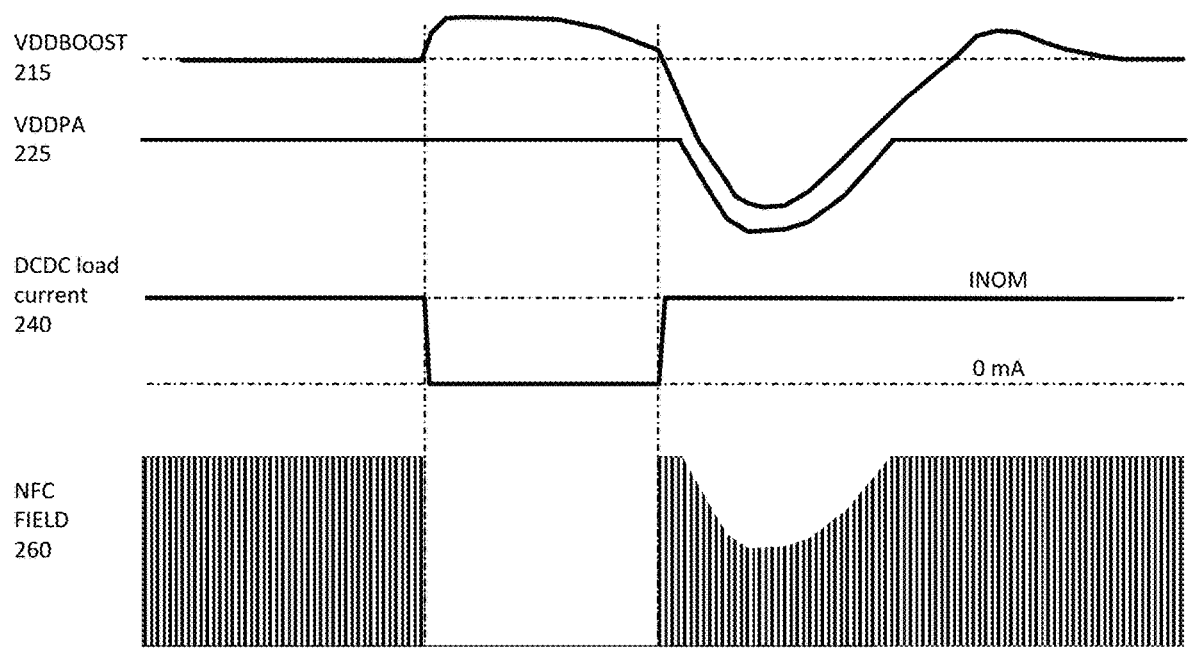
FIG. 2 shows the boost transient response during NFC data exchange of a NFC system that does not utilize a "max" (duty cycle) mode (which results in a negative undershoot of VDDBOOST ("averaged" value), VDDPA, and the NFC field) in accordance with some embodiments of the invention.
Figure 8:
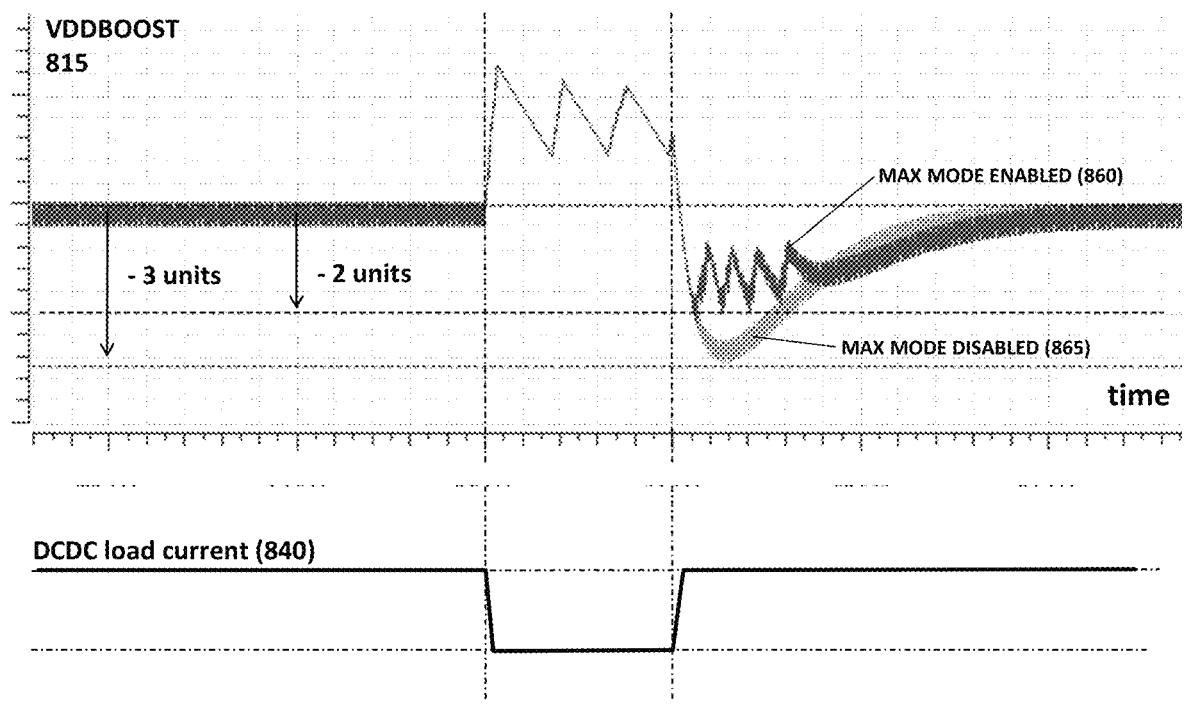
FIG. 8 shows that the negative undershoot of VDDBOOST ("actual" value) is reduced if the "max" (duty cycle) mode is enabled for a NFC system in accordance with some embodiments of the invention.

FIG. 2 shows the boost transient response during NFC data exchange of a NFC system (such as NFC system 100) that does not utilize a "max" (duty cycle) mode (which results in a negative undershoot of VDDBOOST ("averaged" value), VDDPA, and the NFC field) in accordance with some embodiments of the invention. (Note: FIG. 2 actually shows an "averaged" VDDBOOST, where the ripples due to a 3.87 MHz switching frequency have been averaged out. On the other hand, FIG. 8 shows an "actual" VDDBOOST together with the ripples due to a 3.87 MHz switching frequency.) FIG. 2 is showing a potential problem (of a negative undershoot) that can arise during the use of the NFC system 100. For example, this problem (of a negative undershoot) can occur during the transient load response of the supply chain from ASK (Amplitude-shift keying) modulation of the NFC field. When sending data, the NFC transmitter stops the field. This leads to a 100% load variation on DCDC converter (BOOST 110). Drops on VDDBOOST 115 should be filtered by the VDDPA LDO 120, because otherwise this can lead to non-compliancy regarding normalizations on secure data exchange. FIG. 2 shows that switching on a NFC field 260 from an off state can result in a negative undershoot of VDDBOOST 215 and VDDPA 225. This occurs while the DCDC load current is also being switched on from an off state, so the DCDC load current increases from 0 mA to nominal current (INOM) within a short time interval. The net result is a huge initial negative undershoot of the NFC field 260, which is undesirable. Of course, after some time, the system returns to a steady state condition, where VDDBOOST 215, VDDPA 225, and NFC field 260 all return to a stable steady state value. But the initial transient behavior of a huge negative undershoot for VDDBOOST, VDDPA, and the NFC field is clearly undesirable, so that the huge negative undershoot needs to be reduced.

In FIG. 2, for some embodiments, if the time interval between when the NFC field is switched off and when the NFC field is switched back on again is short enough, it is possible that the negative undershoots of VDDBOOST, VDDPA, and the NFC field will be reduced. For some embodiments, if the time interval is very short, it is possible that the negative undershoots of VDDBOOST, VDDPA, and the NFC field will be substantially eliminated.

In FIG. 2, for some embodiments, in fact during ASK (Amplitude-shift keying) the time the NFC field is turned off is very short and the boost will not see it due to its low bandwidth. In some embodiments, the system is really used at the first NFC field on event, because boost is in overshoot protection or pulse skipping with very low duty cycle. In this case, duty cycle is low and the time needed for the loop to respond is too slow. In some embodiments, this system is also used for peer to peer communications, because there is a long time between two NFC field on events.

Figure 3:
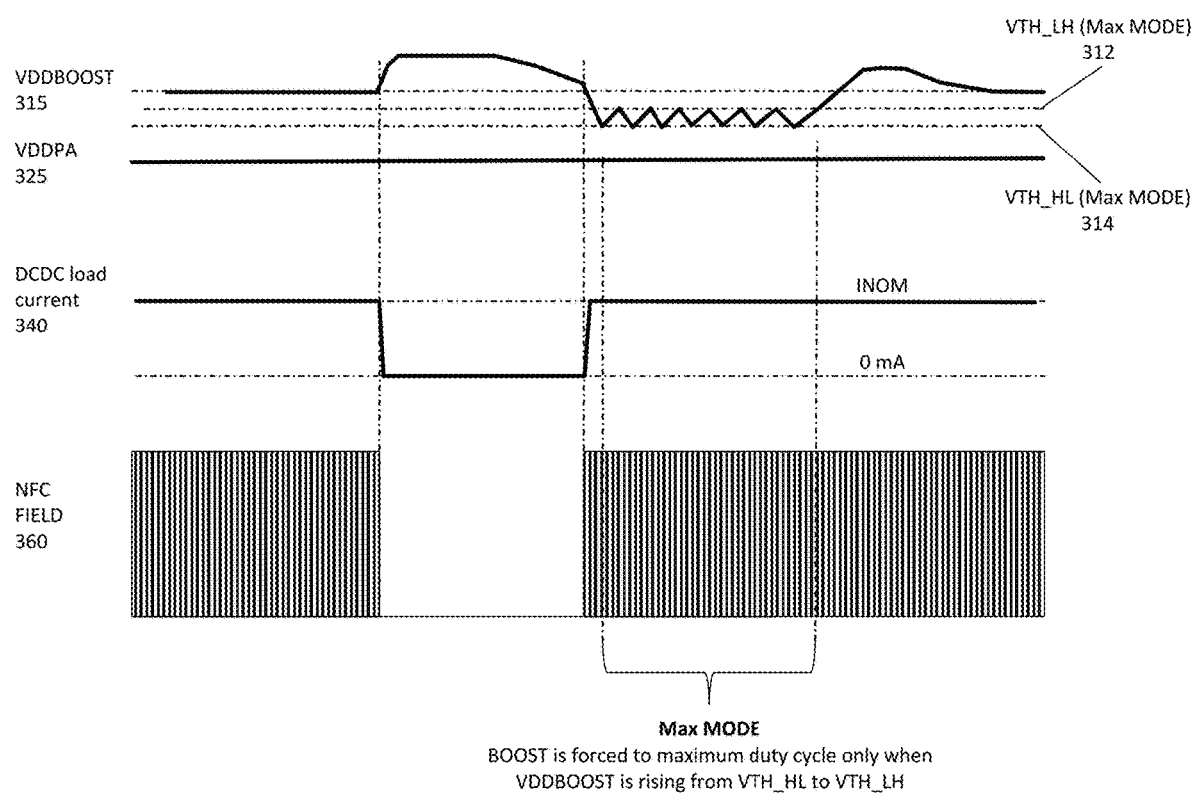
FIG. 3 shows the transient load response during NFC data exchange of a NFC system that utilizes a "max" (duty cycle) mode (which reduces or eliminates the negative undershoot of VDDBOOST ("averaged" value), VDDPA, and the NFC field) in accordance with some embodiments of the invention.

FIG. 3 shows the transient load response during NFC data exchange of a NFC system that utilizes a "max" (duty cycle) mode (which reduces or eliminates the negative undershoot of VDDBOOST ("averaged" value), VDDPA, and the NFC field) in accordance with some embodiments of the invention. (Note: FIG. 3 actually shows an "averaged" VDDBOOST, where the ripples due to a 3.87 MHz switching frequency have been averaged out. On the other hand, FIG. 8 shows an "actual" VDDBOOST together with the ripples due to a 3.87 MHz switching frequency.) FIG. 3 is showing a solution to the problem (of a negative undershoot) that can arise during the use of the NFC system 100. The solution consists of forcing the BOOST PWM clock to be in maximum duty cycle when VDDBOOST drops below a threshold. The setpoint for the maximum duty cycle can be given by a lookup table, or it can be determined by a microcontroller. A NFC system can sense the DCDC input supply voltage (i.e., VBATPWR), and then configured a clamp (e.g., maximum duty cycle) for duty cycle vs. VDDBOOST target.

In particular, FIG. 3 shows that by forcing the BOOST PWM clock to be in maximum duty cycle (which is shown as a "max mode") when VDDBOOST 315 drops below a threshold, the negative undershoot of VDDBOOST is reduced, while the negative undershoots of VDDPA 340 and the NFC field 360 are substantially eliminated. This occurs while the DCDC load current 340 is also being switched on from an off state, so the DCDC load current increases from 0 mA to nominal current (INOM) within a short time interval.

FIG. 3 also shows two VDDBOOST thresholds associated with the "max mode": VTH_LH 312 and VTH_HL 314. VTH_HL 314 (i.e., high to low voltage threshold) is a first VDDBOOST threshold, while VTH_LH 312 (i.e., low to high voltage threshold) is a second VDDBOOST threshold. Initially, when VDDBOOST drops below the first threshold VTH_HL 314, the NFC system will force the BOOST PWM clock to be in maximum duty cycle (i.e., in "max mode"). As the BOOST PWM clock is forced to be in maximum duty cycle (i.e., in "max mode"), VDDBOOST will start to increase. Then, when VDDBOOST rises above the second threshold VTH_LH 312, the NFC system will reset the BOOST PWM clock back to the steady state value for duty cycle (i.e., exit from "max mode"). As the BOOST PWM clock is reset to the steady state value for duty cycle, VDDBOOST will start to decrease. Then, if VDDBOOST again drops below the first threshold VTH_HL 314, the above step of changing the PWM duty cycle to a maximum value (and later resetting the PWM duty cycle back to a steady state value) will be repeated. If, however, the VDDBOOST does not again drop below the first threshold VTH_HL 314 while the PWM duty cycle is set to the steady state value, then the NFC system has stabilized to the steady state condition, and there is no longer any need for the NFC system to enter the "max mode". In FIG. 3, the NFC system is seen to go through the above steps of changing the PWM duty cycle between the maximum value and the steady state value a few times before it stabilizes to the steady state condition.

Figure 4:
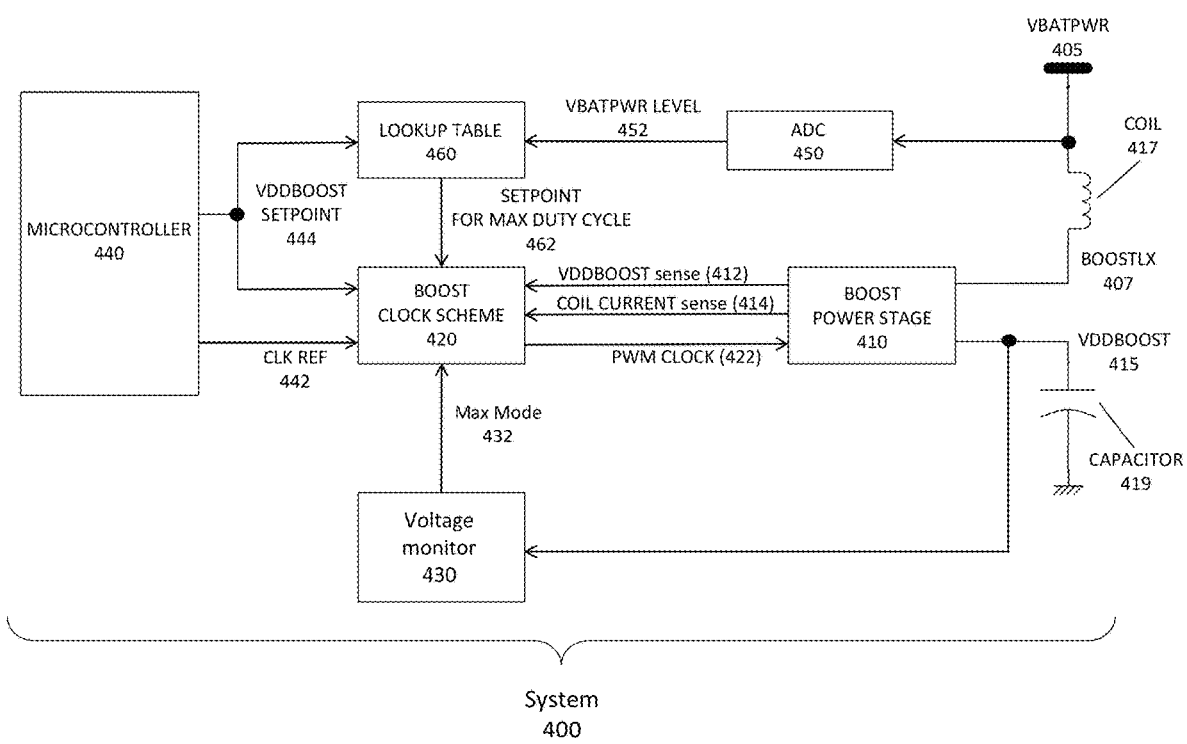
FIG. 4 shows a functional block diagram of a NFC system that can utilize a "max" (duty cycle) mode (which reduces or eliminates the negative undershoot of VDDBOOST, VDDPA, and the NFC field) in accordance with some embodiments of the invention.

FIG. 4 shows a functional block diagram of a NFC system 400 that can utilize a "max" (duty cycle) mode (which reduces or eliminates the negative undershoot of VDDBOOST, VDDPA, and the NFC field) in accordance with some embodiments of the invention. FIG. 4 shows that such a NFC system 400 can be comprised of: (a) a BOOST power stage 410 with an external coil 417 and a decoupling external capacitor 419, (b) a BOOST clock scheme 420 providing PWM clock 422 to BOOST power stage 410, (c) a voltage monitor 430 that is configured to monitor DCDC output voltage (by sensing voltage on VDDBOOST), (d) a microcontroller 440, (e) an ADC 450 on VBATPWR, and (f) a lookup table 460 for configuring setpoint for maximum duty cycle from VBATPWR and VDDBOOST levels.

The BOOST power stage 410 can be a PWM (Pulse Width Modulation) boost power stage configured to provide for PWM boost power conversion. The PWM boost power stage can provide power for generating a NFC (Near Field Communication) field. The PWM boost power stage inputs an input voltage and outputs a boost voltage. In FIG. 4, the input voltage is supplied by VBATPWR 405 (e.g., battery power voltage supply). The output boost voltage is a stepped-up voltage VDDBOOST 415 (e.g., VDD (drain supply) boost voltage). Additionally, FIG. 4 also shows a current level BOOSTLX 407, which is positioned between the external coil 417 and the BOOST power stage 410.

The BOOST clock scheme 420 is configured to provide PWM clock signal 422 to the PWM BOOST power stage 410. The PWM clock signal 422 output is based on inputs from the BOOST power stage 410 (i.e., VDDBOOST sense 412 and coil current sense 414), the voltage monitor 430 (i.e., a "max mode" signal 432 to trigger a maximum duty cycle when VDDBOOST drops below a threshold), the microcontroller 440 (i.e., a clock reference signal 442 and a setpoint 444 for the boost voltage), and the lookup table 460 (i.e., a setpoint 462 for maximum duty cycle).

The voltage monitor 430 is configured to sense the boost voltage output (i.e., VDDBOOST) from the PWM boost power stage 410. The voltage monitor 430 is further configured to provide a "max mode" signal 432 to the BOOST clock scheme 420 in order to trigger a maximum duty cycle when VDDBOOST drops below a threshold.

The microcontroller 440 is configured to provide a clock reference signal 442 and a setpoint 444 for the boost voltage to the boost clock scheme 420. The setpoint 444 for the boost voltage is also provided to the lookup table 460 for determining the maximum duty cycle for a given VBATPWR level and a given VDDBOOST setpoint. In some embodiments, the lookup table 460 determines the maximum duty cycle for a pre-determined VBATPWR level and a pre-determined VDDBOOST setpoint. In some embodiments, a power efficiency associated with the PWM boost power converter is also used for determining the maximum duty cycle.

The ADC (analog-to-digital converter) 450 is configured to convert an input voltage from an analog voltage level (i.e., VBATPWR 405) to a digital voltage level (i.e., VBATPWR level 452). In FIG. 4, the input voltage is supplied by VBATPWR 405 (e.g., battery power voltage supply).

The lookup table 460 is configured for determining setpoint for maximum duty cycle from VBATPWR and VDD- BOOST levels. In other words, the lookup table 460 determines the setpoint 462 for maximum duty cycle based on a given input voltage (i.e., VBATPWR level 452) and a given output voltage (i.e., VDDBOOST setpoint 444). In some embodiments, the lookup table 460 also uses a power efficiency associated with the PWM boost power converter to determine the maximum duty cycle.

It is not shown in FIG. 4, but in some embodiments, the system can operate without a lookup table 460. In those embodiment, the microcontroller 440 can be configured for determining setpoint for maximum duty cycle from VBATPWR and VDDBOOST levels. In other words, the microcontroller 440 determines the setpoint 462 for maximum duty cycle based on a given input voltage (i.e., VBATPWR level 452) and a given output voltage (i.e., VDDBOOST setpoint 444). In some embodiments, the microcontroller 440 can also use a power efficiency associated with the PWM boost power converter to determine the maximum duty cycle.

It is also not shown in FIG. 4, but in some embodiments, an analog device or a combination of an analog device and a digital device (instead of a lookup table or a microcontroller) can be configured for determining setpoint for maximum duty cycle from VBATPWR and VDDBOOST levels. In other words, an analog device or a combination of an analog device and a digital device determines the setpoint 462 for maximum duty cycle based on a given input voltage (i.e., VBATPWR level 452) and a given output voltage (i.e., VDDBOOST setpoint 444). In some embodiments, an analog device or a combination of an analog device and a digital device can also use a power efficiency associated with the PWM boost power converter to determine the maximum duty cycle.

Figure 5:
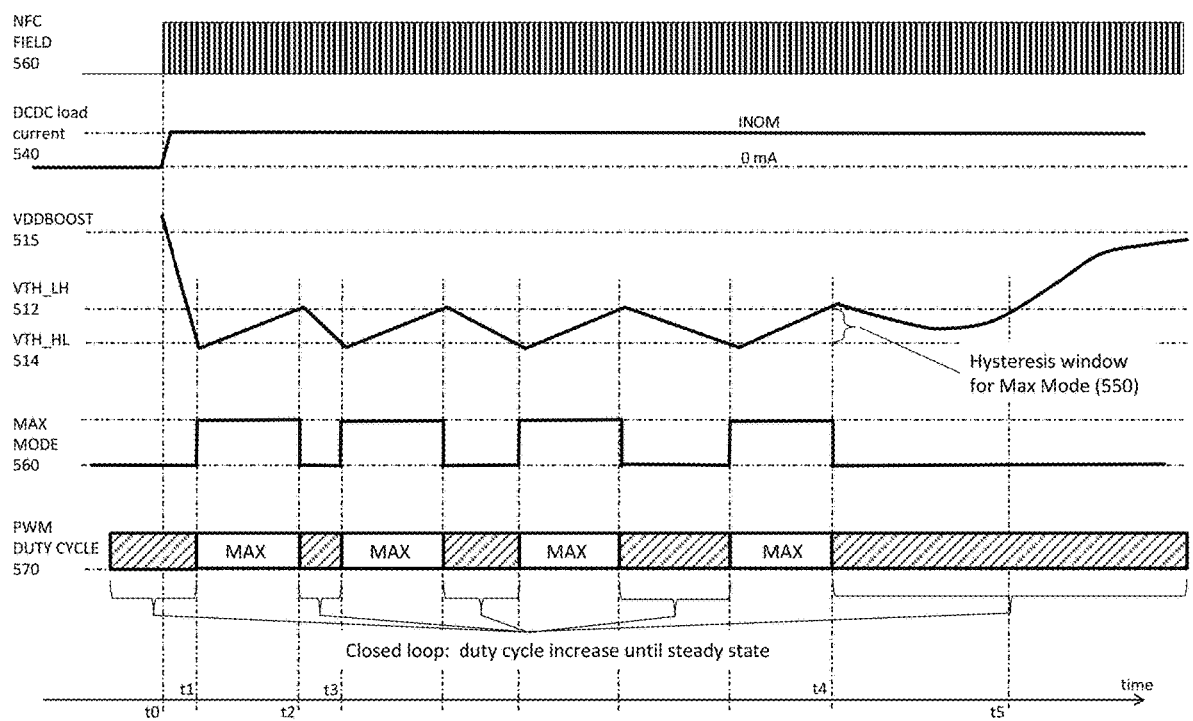
FIG. 5 shows a chronogram of the various signals during load response of a NFC system that is utilizing a "max" (duty cycle) mode to reduce or eliminate the negative undershoot of VDDBOOST ("averaged" value), VDDPA, and the NFC field in accordance with some embodiments of the invention.

FIG. 5 shows a chronogram of the various signals during load response of a NFC system that is utilizing a "max" (duty cycle) mode to reduce or eliminate the negative undershoot of VDDBOOST ("averaged" value), VDDPA, and the NFC field in accordance with some embodiments of the invention. (Note: FIG. 5 actually shows an "averaged" VDDBOOST, where the ripples due to a 3.87 MHz switching frequency have been averaged out. On the other hand, FIG. 8 shows an "actual" VDDBOOST together with the ripples due to a 3.87 MHz switching frequency.) FIG. 5 is very similar to previously described FIG. 3, but FIG. 5 provides more details for helping to understand the disclosed invention. In particular, FIG. 5 shows the following signals in the time period after the NFC field 560 has been switched on from an off state: NFC field 560, DCDC load current 540, VDDBOOST 515, "max mode" signal 560, and PWM duty cycle 570.

At the initial state (i.e., before time=t0), there is no NFC field, so there is no DCDC load current. The BOOST is in pulse skipping, with no PWM clock.

At time=t0, the NFC field is switched ON. The DCDC load current increases, so VDDBOOST drops.

At time=t1, high to low threshold (VTH_HL 514) is triggered from the VDDBOOST fall. The "max mode" internal signal 560 goes to a high level. PWM clock is override at maximum duty cycle. Setpoint for maximum duty cycle can be given from a VDDBOOST/VBATPWR lookup table.

Between time t1 and t2, VDDBOOST rises due to maximum duty cycle. At time=t2, VDDBOOST reaches low to high threshold (VTH_LH 512) for "max mode". "Max mode" signal set to low level, BOOST is back to regulation.

Between time t2 and t3, BOOST loop not yet locked, so PWM duty cycle is still too low. VDDBOOST falls, until again triggering VTH_HL of "max mode".

Between time t3 and t4, BOOST goes alternatively from "max mode" to closed loop. VDDBOOST is kept within the hysteresis window (550) of "max mode".

At time=t5, BOOST escapes from the "max mode" zone when PWM duty cycle of regulation loop reaches steady state.

Figure 6:
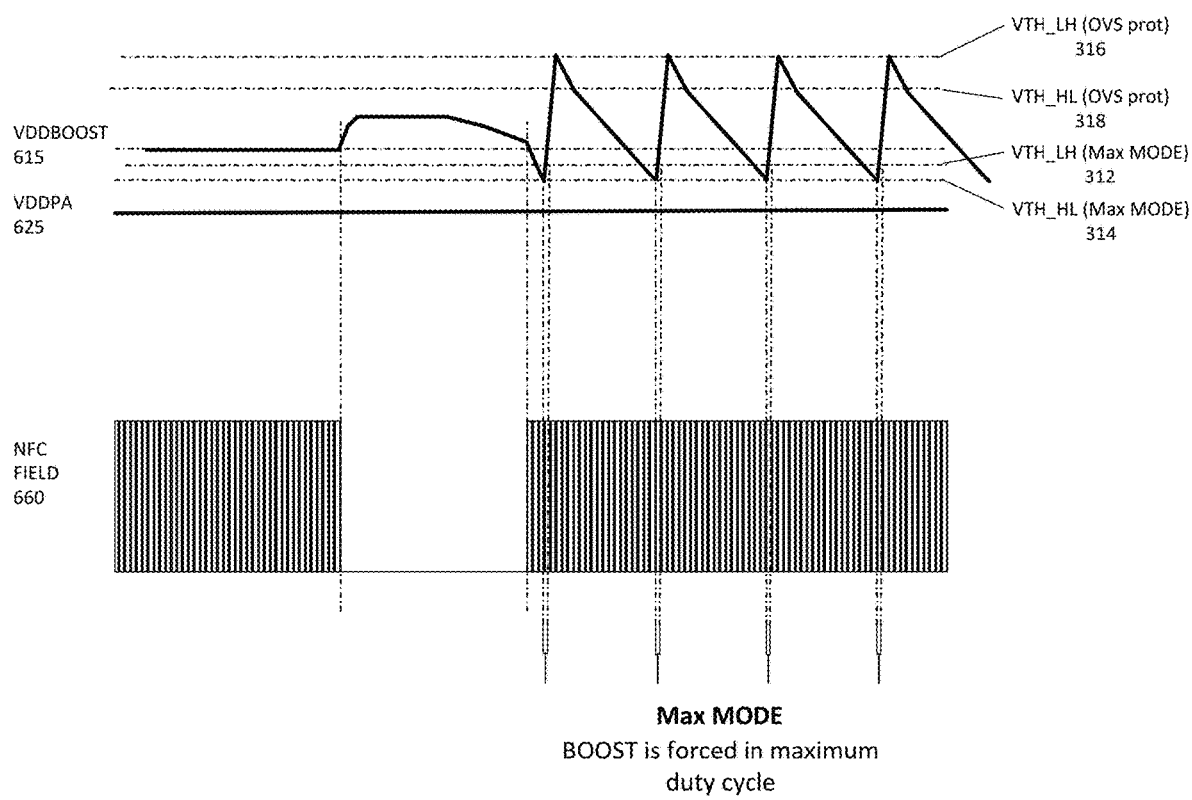
FIG. 6 shows why a maximum duty cycle that is too high can result in VDDBOOST ("averaged" value) instability.

FIG. 6 shows the following signals: NFC field 660, VDDBOOST 615 ("averaged" value), and VDDPA 625. (Note: FIG. 6 actually shows an "averaged" VDDBOOST, where the ripples due to a 3.87 MHz switching frequency have been averaged out. On the other hand, FIG. 8 shows an "actual" VDDBOOST together with the ripples due to a 3.87 MHz switching frequency.) FIG. 6 also shows the low to high threshold (VTH_LH 312) and the high to low threshold (VTH_HL 314) for "max mode". Additionally, FIG. 6 also shows the low to high threshold (VTH_LH 316) and the high to low threshold (VTH_HL 318) for overshoot protection (OVS prot).

FIG. 6 shows why a maximum duty cycle that is too high can result in VDDBOOST instability. In particular, FIG. 6 shows that if maximum duty cycle is too high vs VBATPWR/VDDBOOST headroom, then BOOST goes into relaxation. VDDBOOST is unstable going from the "max mode" threshold to the "OVS prot" (overshoot protection) threshold. In such a scenario, there is no possible escape from the loop going between the "max mode" threshold and the "OVS prot" (overshoot protection) threshold. In some embodiments, this scenario can be avoided by using a "maximum duty cycle" from a lookup table, which can tailor the "maximum duty cycle" to a lower value.

FIG. 7 shows the formulas for the theoretical duty cycle in PWM (Pulse Width Modulation) regulation and the maximum duty cycle in PWM regulation with power loss.

For PWM BOOST converter, the duty cycle is fixed by the ratio between VBATPWR and VDDBOOST. Therefore, as shown in FIG. 7, the formula for the theoretical duty cycle in PWM (Pulse Width Modulation) regulation is given as:

$$\text{Duty cycle} = 1 - \frac{VBATPWR}{VDDBOOST}$$

Therefore, as an example, if VBATPWR=3V and VDDBOOST=5V, then Duty cycle=0.4.

Assuming power losses, maximum value for PWM duty cycle can be corrected for power losses using the parameter "Power Efficiency". As shown in FIG. 7, the formula for the maximum duty cycle in PWM regulation with power loss is given as:

$$\text{Duty cycle} = \left(1 - \frac{VBATPWR}{VDDBOOST}\right) \times \left(1 + \frac{100 - \text{Power Efficiency (\%)}}{100}\right)$$

Therefore, as an example, if VBATPWR=3V and VDDBOOST=5V, and Power Efficiency=80%, then Duty cycle=0.48.

In some embodiments, the above formulas can be used to calculate setpoint for "Max Mode" duty cycle. In some embodiments, a microcontroller can use the above formulas to determine the maximum value for "Max Mode" duty cycle. In some embodiments, a microcontroller can use some other formulas or functions to determine the maximum value for "Max Mode" duty cycle. In some embodiments, a lookup table can be implemented versus VDDBOOST and VBATPWR level. In some embodiments, a microcontroller and a lookup table can be used in combination to determine the maximum value for "Max Mode" duty cycle.

FIG. 8 shows that the negative undershoot of VDD-BOOST ("actual" value) is reduced if the "max" (duty cycle) mode is enabled for a NFC system in accordance with some embodiments of the invention. (Note: FIG. 8 shows an "actual" VDDBOOST together with the ripples due to a 3.87 MHz switching frequency.) In particular, FIG. 8 shows that a huge negative undershoot of VDDBOOST 815 can result from switching on a NFC field from an off state. The switching on of the NFC field corresponds to the rise in the DCDC load current 840, and, as can be seen in FIG. 8, this results in a huge 3-unit negative undershoot of VDDBOOST when "max mode" is disabled (see 865). However, if "max mode" is enabled (see 860), the negative undershoot of VDDBOOST is reduced to 2-unit. Therefore, the negative undershoot of VDDBOOST can be reduced by enabling the "max" (duty cycle) mode for a NFC system.

Figure 9:
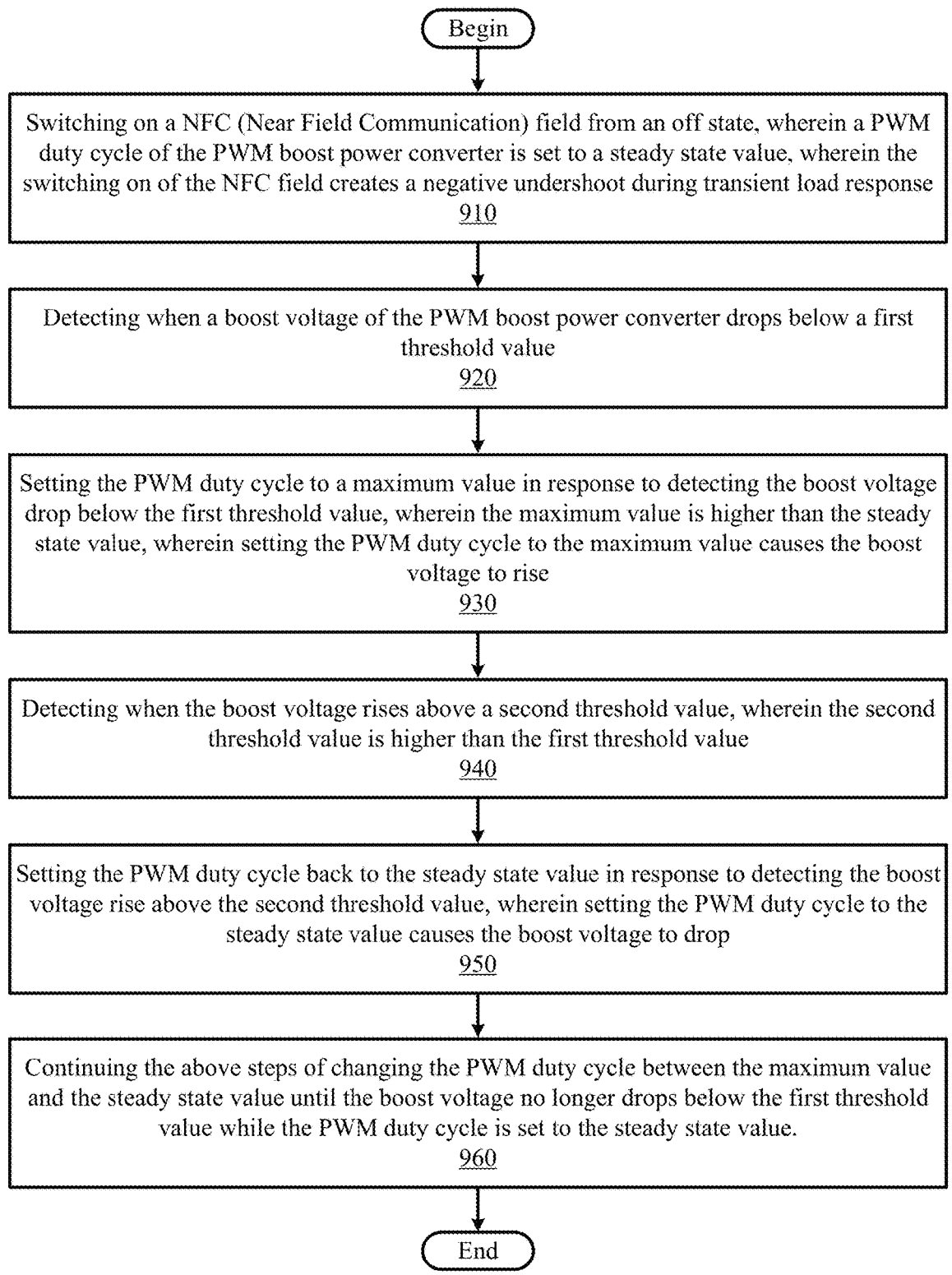
FIG. 9 shows a method for reducing negative undershoot during transient load response that is associated with a PWM (Pulse Width Modulation) boost power converter in accordance with some embodiments of the invention.

FIG. 9 shows a method for reducing negative undershoot during transient load response that is associated with a PWM (Pulse Width Modulation) boost power converter in accordance with some embodiments of the invention. As shown in FIG. 9, the method 900 begins at step 910, where the method switching on a NFC (Near Field Communication) field from an off state, wherein a PWM duty cycle of the PWM boost power converter is set to a steady state value, wherein the switching on of the NFC field creates a negative undershoot during transient load response. Then, the method proceeds to step 920. In step 920, the method detects when a boost voltage of the PWM boost power converter drops below a first threshold value. Next, at step 930, the method sets the PWM duty cycle to a maximum value in response to detecting the boost voltage drop below the first threshold value, wherein the maximum value is higher than the steady state value, wherein setting the PWM duty cycle to the maximum value causes the boost voltage to rise. Then, the method proceeds to step 940. In step 940, the method detects when the boost voltage rises above a second threshold value, wherein the second threshold value is higher than the first threshold value. Next, at step 950, the method sets the PWM duty cycle back to the steady state value in response to detecting the boost voltage rise above the second threshold value, wherein setting the PWM duty cycle to the steady state value causes the boost voltage to drop. Finally, at step 960, the method continues the above steps of changing the PWM duty cycle between the maximum value and the steady state value until the boost voltage no longer drops below the first threshold value while the PWM duty cycle is set to the steady state value.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

The computer-useable or computer-readable medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disc, and an optical disc. Examples of optical discs include a compact disc with read only memory (CD-ROM), a compact disc with read/write (CD-R/W), a digital video disc (DVD), and a Blu-ray disc.

The various aspects, embodiments, implementations or features of the described embodiments can be used separately or in any combination. Various aspects of the described embodiments can be implemented by software, hardware or a combination of hardware and software.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

The invention claimed is:

1. A method for reducing negative undershoot during transient load response that is associated with a PWM (Pulse Width Modulation) boost power converter, the method comprising:

switching on a NFC (Near Field Communication) field from an off state, wherein a PWM duty cycle of the PWM boost power converter is set to a steady state value, wherein the switching on of the NFC field creates a negative undershoot during transient load response;

detecting when a boost voltage of the PWM boost power converter drops below a first threshold value;

setting the PWM duty cycle to a maximum value in response to detecting the boost voltage drop below the first threshold value, wherein the maximum value is higher than the steady state value, wherein setting the PWM duty cycle to the maximum value causes the boost voltage to rise;

detecting when the boost voltage rises above a second threshold value, wherein the second threshold value is higher than the first threshold value;

setting the PWM duty cycle back to the steady state value in response to detecting the boost voltage rise above the second threshold value, wherein setting the PWM duty cycle to the steady state value causes the boost voltage to drop;

continuing the above steps of changing the PWM duty cycle between the maximum value and the steady state value until the boost voltage no longer drops below the first threshold value while the PWM duty cycle is set to the steady state value.

2. A method for reducing negative undershoot during transient load response that is associated with a PWM (Pulse Width Modulation) boost power converter, the method comprising:
   switching on a NFC (Near Field Communication) field from an off state, wherein a PWM duty cycle of the PWM boost power converter is set to a steady state value, wherein the switching on of the NFC field creates a negative undershoot during transient load response;
   detecting when a boost voltage of the PWM boost power converter drops below a first threshold value;
   setting the PWM duty cycle to a maximum value corresponding to a maximum duty-cycle mode of operation in response to detecting the boost voltage drop below the first threshold value, wherein the maximum value is higher than the steady state value, wherein setting the PWM duty cycle to the maximum value causes the boost voltage to rise, wherein the maximum value is based on an input voltage to the PWM boost power converter and an output voltage from the PWM boost power converter;
   detecting when the boost voltage rises above a second threshold value, wherein the second threshold value is higher than the first threshold value;
   setting the PWM duty cycle back to the steady state value, in which the maximum duty-cycle mode of operation is disabled, in response to detecting the boost voltage rise above the second threshold value, wherein setting the PWM duty cycle to the steady state value causes the boost voltage to drop; and
   continuing the above steps of changing the PWM duty cycle between the maximum value and the steady state value until the boost voltage no longer drops below the first threshold value while the PWM duty cycle is set to the steady state value.

3. The method of claim 2, wherein the maximum value is further based on a power efficiency associated with the PWM boost power converter.

4. The method of claim 2, wherein the maximum value is stored in a lookup table.

5. The method of claim 2, wherein the maximum value is determined by a microcontroller.

6. The method of claim 1, wherein the NFC field is generated by a NFC transmitter, wherein the NFC transmitter is supplied by an output from a LDO (Low-Dropout Regulator) voltage regulator, wherein the LDO voltage regulator is supplied by an output from the PWM boost power converter.

7. The method of claim 1, wherein the transient load response occurs during an initial NFC field on event and/or peer to peer communications.

8. The method of claim 1, wherein the transient load response occurs when a time period between current NFC field on event and last NFC field on event is long.

9. A system comprising:
   a PWM (Pulse Width Modulation) boost power stage, the PWM boost power stage configured to provide for PWM boost power conversion, wherein the PWM boost power stage provides power for generating a NFC (Near Field Communication) field, wherein the PWM boost power stage inputs an input voltage and outputs a boost voltage;
   a boost clock scheme, the boost clock scheme configured to provide PWM clock signal to the PWM boost power stage;
   a voltage monitor, the voltage monitor configured to sense the boost voltage from the PWM boost power stage;
   a microcontroller, the microcontroller configured to provide a clock reference signal to the boost clock scheme and a setpoint for the boost voltage,
   wherein the boost clock scheme sets a PWM duty cycle of the PWM boost power stage to a steady state value, wherein switching the NFC field from an "off" state to an "on" state creates a negative undershoot associated with a transient load response,
   wherein the voltage monitor detects when the boost voltage drops below a first threshold value,
   wherein the boost clock scheme sets the PWM duty cycle to a maximum value in response to the voltage monitor detecting the boost voltage drop below the first threshold value, wherein the maximum value is higher than the steady state value, wherein setting the PWM duty cycle to the maximum value causes the boost voltage to rise,
   wherein the voltage monitor detects when the boost voltage rises above a second threshold value, wherein the second threshold value is higher than the first threshold value,
   wherein the boost clock scheme sets the PWM duty cycle back to the steady state value in response to the voltage monitor detecting the boost voltage rise above the second threshold value, wherein setting the PWM duty cycle to the steady state value causes the boost voltage to drop,
   wherein the boost clock scheme continues the above steps of changing the PWM duty cycle between the maximum value and the steady state value until the boost voltage no longer drops below the first threshold value while the PWM duty cycle is set to the steady state value.

10. The system of claim 9, wherein the maximum value is based on the input voltage and the boost voltage, wherein the ADC provides the input voltage and the voltage monitor provides the boost voltage.

11. The system of claim 10, wherein the maximum value is further based on a power efficiency associated with the PWM boost power stage.

12. The system of claim 10, further comprising
   an ADC (analog-to-digital converter), the ADC configured to convert the input voltage from an analog voltage level to a digital voltage level;
   a lookup table configured to determine the maximum value.

13. The system of claim 10, wherein the maximum value is determined by the microcontroller.

14. The system of claim 9, wherein the NFC field is generated by a NFC transmitter, wherein the NFC transmitter is supplied by an output from a LDO (Low-Dropout Regulator) voltage regulator, wherein the LDO voltage regulator is supplied by an output from the PWM boost power stage.

15. A computer program product comprising executable instructions encoded in a non-transitory computer readable medium which, when executed by a system, carry out or control the method of claim 1.

* * * * *